United States Patent [19]

Barham et al.

[11] 4,311,660
[45] Jan. 19, 1982

[54] HEAT-TREATING POLYOLEFIN FILMS

[75] Inventors: Peter J. Barham, Southmead; Jeffrey A. Odell, Knowle; Frank M. Willmouth, Royston, all of England

[73] Assignee: Imperial Chemical Industries Limited, London, England

[21] Appl. No.: 170,834

[22] Filed: Jul. 16, 1980

[30] Foreign Application Priority Data

Aug. 7, 1979 [GB] United Kingdom ............... 27412/79

[51] Int. Cl.³ ............................................. B29C 25/00
[52] U.S. Cl. ............................ 264/342 RE; 156/229; 264/346; 427/412.3; 428/516; 528/502; 528/503
[58] Field of Search ...................... 264/235, 342, 346; 528/503; 156/229

[56] References Cited

U.S. PATENT DOCUMENTS

| | | | |
|---|---|---|---|
| 3,261,903 | 7/1966 | Carr | 264/235 |
| 3,570,052 | 3/1971 | Reade | 264/342 R |
| 3,632,726 | 1/1972 | Knox | 264/235 |
| 3,632,733 | 1/1972 | Yazawa | 264/235 |
| 3,659,000 | 4/1972 | Cronk | 264/235 |
| 3,679,791 | 7/1972 | Reade | 264/342 R |
| 3,814,785 | 6/1974 | Reade | 264/235 |
| 3,843,761 | 10/1974 | Bierenbaum | 264/235 |
| 4,003,973 | 1/1977 | Kurokawa | 264/235 |
| 4,085,175 | 4/1978 | Keuchel | 264/235 |

OTHER PUBLICATIONS

Jack; J., British Plastics, Jun. 1961, pp. 312-318.
Jack; J., British Plastics, Jul. 1961, pp. 391-394.
Arridge; R. G. C., J. of Polymer Science, vol. 15, pp. 389-401, (1977).

*Primary Examiner*—C. A. Henderson
*Attorney, Agent, or Firm*—Cushman, Darby & Cushman

[57] ABSTRACT

The invention provides a method of heat-treating a biaxially oriented polyolefin film by constraining the film against shrinkage, heating the constrained film to at least the minimum stress relaxation temperature of the polyolefin, and thereafter cooling the treated film to a temperature below the alpha-relaxation temperature of the polyolefin. The film is preferably heated rapidly to the required temperature and cooled rapidly therefrom. The resultant films exhibit good modulus and thermal shrinkage characteristics. The heat-treatment may be supplemented by a conventional heat-setting operation to improve heat-sealing characteristics of the treated films.

7 Claims, 2 Drawing Figures

HEAT-TREATING POLYOLEFIN FILMS

SUMMARY OF THE INVENTION

This invention relates to an oriented polyolefin film and, in particular, to a method of heat-treating a biaxially oriented polyolefin film.

BACKGROUND OF THE INVENTION

When a film of an organic thermoplastic, crystallisable polyolefin, such as polypropylene, is drawn to cause molecular orientation therein and thereby improve its physical properties, the resulting film will normally have, for many applications, an undesirably high shrinkage at elevated temperatures. Proposals have been made for improving the dimensional stability at elevated temperatures of such oriented films by processes known in the art as heat-setting operations in which an oriented film is heated, while restrained against shrinkage, at a temperature above the glass transition temperature (Tg) of the polymer and below its melting point. The optimum heat-setting temperature can readily be established by simple experimentation, and in practice heat-setting of a polypropylene film is usually effected at temperatures in the range of from 100° C. to 140° C. Heat-setting may be effected by conventional techniques—for example by means of a stenter system, or by a system of one or more heated rollers as disclosed, for example, in British Pat. No. 1,124,886. In a conventional heat-setting operation of this kind a biaxially oriented film, although restrained against shrinkage, is, in practice, permitted to shrink in controlled fashion by a significant amount. For example, an area shrinkage (the sum of the linear shrinkages in each of the longitudinal and transverse directions) of the order of 20 to 25% may be tolerated.

We have now devised an improved heat-treating technique for oriented polyolefin film.

DETAILED DESCRIPTION OF THE INVENTION

Accordingly, the present invention provides a method of heat-treating a biaxially oriented polyolefin film comprising constraining the film against shrinkage, heating the constrained film to at least the minimum stress relaxation temperature of the polyolefin, as hereinafter defined, and thereafter cooling the treated film to a temperature below the alpha-relaxation temperature of the polyolefin, as hereinafter defined.

The present invention further provides a method of heat-treating a biaxially oriented polyolefin film comprising constraining the film against shrinkage, heating the constrained film within a period not exceeding 5.3T seconds, and preferably within a period of from 0.00058T to 3.6T seconds, to a treatment temperature in a range of from (T−15) to (T+10)°C., wherein T°C. is the melting temperature, as hereinafter defined, of the polyolefin, and thereafter cooling the treated film to a temperature not exceeding (T−80)°C.

The invention still further provides a biaxially oriented polyolefin film when heat-treated by either of the immediately aforementioned methods.

Figure 1:
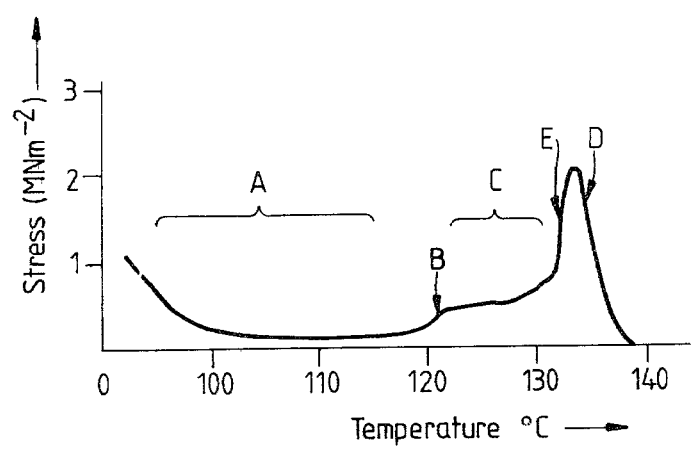
Figure 2:
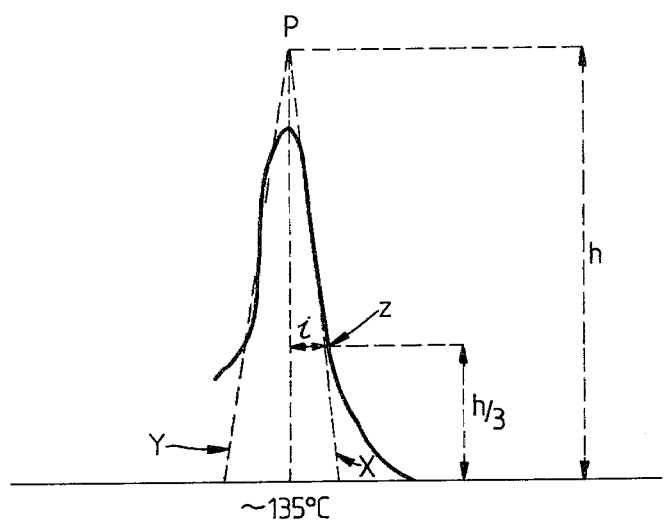

We have observed that when a strip of an oriented polyolefin film is tensioned in the direction of orientation under a small strain of the order of 0.01 percent, the tension in the film being monitored by conventional means such as a load cell, and the film temperature is slowly and progressively raised, the stress behaviour of the film in relation to the temperature can be represented by a curve of the kind illustrated in FIG. 1 of the accompanying drawings. Thus, in the curve of FIG. 1, representing the behaviour of an oriented high density polyethylene film, in which the temperature region above 100° C. is plotted on an enlarged scale, there first occurs a characteristic reversible drop (A) in the film stress followed by a sudden irreversible increase (B) in stress—for example, at a film temperature of about 110°-120° C. Thereafter the film stress remains relatively constant (C) with increasing temperature until a threshold temperature (D) is reached at which the stress sharply decays to zero as the film relaxes and finally melts. In some instances this final decay is immediately preceded by a large irreversible increase (E) in stress. If in the enlarged plot of the threshold temperature region illustrated in FIG. 2, a tangent x, y, is drawn to the respective maximum and minimum slopes of the graph above and below the threshold temperature these tangents will intersect to define a precise threshold temperature P. A point z on the tangent x to the curve above the precise threshold temperature, and located one third of the distance h from the base-line of the curve (zero stress) to the point of intersection of the tangents defines a temperature greater than the precise threshold temperature by an increment i. A range of temperature extending above and below the precise threshold temperature by the amount of this increment (i.e. the total range, P±i, is twice the increment) is herein defined as the "stress relaxation temperature". A commercially available high density polyethylene has been observed, when uniaxially oriented, to have a precise threshold temperature of the order of 135° C., while that for a uniaxially oriented propylene homopolymer is of the order of 165° C.

The alpha-relaxation temperature herein employed is the highest temperature at which a significant relaxation effect, such as dielectric loss, is observed in a sample of the polyolefin at a frequency of one cycle per second in the sense employed by McCrum, Read and Williams in "Anelastic and Dielectric Effects in Polymeric Solids", (Wiley) London, 1967. The alpha-relaxation temperature is usually some 50° to 100° C. below the melting temperature of the polymer. Thus, the well-known alpha peak in low density polyethylene occurs at about 50° C. at one cycle per second, while that for a drawn polypropylene occurs (depending on the sample preparation) at or above about 120° C. at one cycle per second.

The melting temperature, T, herein employed is defined as the peak of the Differential Scanning Calorimetry melting endotherm observed in respect of a polymer sample in the reheating stage of a thermal cycle in which the sample has been heated from room temperature to 230° C. (160° C. for a predominantly ethylene polymer), held at that temperature for 5 minutes (2 minutes for a predominantly ethylene polymer), cooled to room temperature, and reheated, each of the heating, cooling and reheating stages in the cycle being effected at a rate of 20° C. per minute. The melting temperature of a substantially crystalline propylene homopolymer measured by this technique will normally be of the order of 170° C., while that of a commercially available high density polyethylene will be of the order of 137° C.

By a biaxially oriented polyolefin film is meant a self-supporting (i.e. capable of independent existence in the absence of a supporting substrate) polyolefin film which has been drawn, at a temperature above the glass transition temperature (Tg) of the polyolefin, in two mutually perpendicular directions in the plane of the film to induce molecular orientation therein. The biaxial orientation may be balanced or unbalanced—for example, with the higher degree of orientation of an unbalanced film in a preferred direction—usually the longitudinal or machine direction (as opposed to the transverse direction). The longitudinal and transverse drawing may be effected simultaneously or sequentially.

If desired the biaxially oriented polyolefin film may be cooled to a temperature not exceeding about 50° C. before being subjected to the herein described heat-treatment.

For effective treatment according to the invention a film should be heated at least to the minimum stress relaxation temperature, $(P-i)°C.$, and may be heated to higher temperatures provided that the structural integrity of the film is maintained at these higher temperatures. Preferably, the film is heated to a treatment temperature within the stress relaxation temperature range, i.e. $(P\pm i)° C$.

While being heated to, and maintained at a treatment temperature, at or above the minimum stress relaxation temperature, the film should be constrained against shrinkage. Desirably, therefore, the film is maintained at constant dimensions during the treatment, but a small shrinkage—for example, not more than 5% (and preferably not more than 2%) of the original dimension may be tolerated in one or each of the longitudinal and transverse directions of the film. The permissible shrinkage (if any) is therefore considerably less than that tolerated in a conventional heat-setting operation. To achieve the desired constraint the film may, for example, be held, during the heat treatment, in an appropriately dimensioned frame, or may be tensioned on a system of rollers.

Desirably, heating of the film to the treatment temperature is effected rapidly to assist in the production of a film with acceptable modulus and thermal shrinkage characteristics. Conveniently therefore the film is raised to the treatment temperature within a period of less than 5.3T seconds, T being the melting temperature of the polyolefin as hereinbefore defined. Desirably the film is raised to the treatment temperature within a period of from 0.05 to 200 seconds, preferably within a period of from 0.1 to 60 seconds.

Measurement of the temperature of a film per se is notoriously difficult, particularly in relation to a film web travelling at high speed through a continuous film production and treatment process. However, the thermal capacity of polyolefin films is such that the film rapidly attains the temperature of the ambient atmosphere, particularly where the film is heated by direct contact with a heat source, such as a heated platen. Accordingly, the heat treatment temperature is defined as the ambient temperature to which the film is exposed during the treatment. In practice, the film may be heated to the treatment temperature by conventional techniques, for example—by exposure of the film to radiant elements, by passage of the film through a heated air oven, or by contact of the film with the surface of a heated plate or roller.

Heat-treatment of an oriented polyolefin film may, in accordance with the invention, be effected at a treatment temperature exceeding the normal crystalline melting temperature (as hereinbefore defined) of the polyolefin. The ability to operate at treatment temperatures of this magnitude is attributed to the stress applied to constrain the film against shrinkage, the melting temperature of a stressed polyolefin exceeding that of an unstressed polyolefin. The treatment temperature is preferably within a range of from $(T-15)$ to $(T+10)°C.$, particularly preferably from $(T-10)$ to $(T+5)°C$.

We have observed that provided the film is heated to the treatment temperature in accordance with the hereinbefore described schedule, the film need not be maintained at the treatment temperature for a significant period of time to achieve the desired improvement in properties. Although an extended period at the treatment temperature is not detrimental to the film characteristics, economic considerations dictate that the period for which the film is maintained at the treatment temperature should be minimal.

Cooling of the heat-treated film to below the alpha-relaxation temperature is desirably effected rapidly—for example, by directing a stream of coolant fluid (gas or liquid) at the heated film, by plunging the film into a quench bath of coolant liquid, or by running the film over and in contact with the surface of a cooled platen or roller. Desirably, the treated film should be cooled to a temperature not exceeding $(T-80)°C.$ in less than 30 seconds from initiation of the cooling sequence.

During the cooling sequence the film is desirably constrained against shrinkage. Preferably therefore the film is maintained at constant dimensions throughout the cooling sequence. On occasion, a small increase in film dimensions may be observed during the cooling sequence.

Films for treatment according to the present invention are suitably fabricated from a polymer of an alpha-mono-olefin the molecule of which contains from 2 to 6 carbon atoms, such as ethylene, propylene, butene-1, 4-methylpentane-1, and hexene-1. Copolymers of two or more of these olefins may also be employed, a preferred oriented packaging film being formed from a substantially crystalline propylene homo- or block copolymer, the latter containing, for example, up to 20% by weight of the copolymer of another copolymerisable alpha-olefin such as ethylene or butene-1. In particular, the film subjected to the heat-treatment may comprise a polyolefin substrate having on at least one surface thereof a layer of a polymeric heat-sealable material a substantial proportion of which melts at a temperature below the melting temperature (as hereinbefore defined) of the substrate polyolefin. Desirably the melting temperature of the heat-sealable polymeric layer should be below that temperature at which the heat-treatment is effected. Suitable heat-sealable materials include olefin copolymers such as a propylene-butene-1 random copolymer, containing up to about 20% by weight of butene-1, as described in British Pat. No. 1,452,424, or a blend thereof with a butene-1 homo- or co-polymer, as described in British Pat. No. 1,495,776. Other propylene-rich polymers which may be employed as the heat-sealable material include a random propylene-ethylene copolymer containing up to 10 (preferably from 3 to 6) weight % of ethylene and a random propylene-ethylene-butene-1 terpolymer containing not more than 10 (preferably not more than 5) weight % of each of ethylene and butene-1. Ethylene-higher olefin (e.g. propylene or butene-1) copolymers, particularly those containing not more than 15 weight % of the higher olefin comonomer, may also be employed, as may be non-olefinic heat-sealable materials, such as a vinylidene chloride-acrylonitrile copolymer.

Films treated according to the present invention may contain any of the additives conventionally employed in the production of thermoplastic films, and may be subjected to conventional after-treatments—for example, exposure to a corona discharge treatment to improve the bonding and print-receptive characteristics of the film surface.

The thickness of the treated films may vary depending on the intended application, but usually we find that films having a total thickness of from 2 to 150 microns are of general utility. Films intended for use as packaging films are suitably within a thickness range from 10 to 50 microns. An advantage of effecting the heat-treatment while the film is maintained at substantially constant linear dimensions is that the film thickness thereby remains substantially unaltered during the treatment. In practice, it is observed that when the heat-treatment is effected by passing the film around and in contact with the polished surface of a heated roller a degree of thickening of the longitudinal edges of the film occurs but that the central portion of the film retains its original thickness and area. Typically an edge region not exceeding 2% of the film width will increase to not more than twice the original film thickness As hereinbefore described, conventional heat-setting of a polyolefin film is effected primarily to achieve a reduction in thermal shrinkage of the treated film. Unfortunately, in so doing, a reduction in the stiffness (tensile modulus) of the film is usually also effected. The "feel", and ability of the film to run well on packaging machinery, are thereby impaired. In addition to improving (reducing) the thermal shrinkage characteristics of polyolefin films the heat-treatment technique of the present invention may offer an improvement in film stiffness. In particular a better balance (isotropic) of tensile modulus in each of the machine and transverse directions of the film, allied to reduce thermal shrinkage, may be achieved. The improvement in tensile modulus may not be observed immediately after the heat-treatment. Indeed, a film which has been heat-treated according to the invention may initially display a reduction in tensile modulus. However, on storage of the treated film for a few hours the tensile modulus may be observed to increase beyond both that of the untreated film and of the film when heat-set by conventional techniques.

Although the heat-treatment technique of the invention may be independently applied to a biaxially oriented polyolefin film, an improved balance of film characteristics may be achieved by subjecting the film to the specified heat-treatment in conjunction with a conventional heat-setting treatment. The conventional heat-setting treatment may be applied before or after the film is subjected to a heat-treatment according to the invention and, if desired, the film may be, and preferably is, cooled to a temperature of below about 50° C. between the heat-setting and heat-treatment operations.

For the purposes of the aforementioned combined treatment a conventional heat-setting operation comprises restraining a biaxially oriented polyolefin film against shrinkage, heating the restrained film to a heat-setting temperature above the glass transition temperature (Tg) and below the stress relaxation temperature, as hereinbefore defined, of the polyolefin, permitting the film to shrink at the heat-setting temperature to effect an area reduction (the sum of the linear shrinkages in each of the longitudinal and transverse directions) of not more than 25%, and, optionally, cooling the heat-set film.

A preferred embodiment of a conventional heat-setting operation comprises restraining a biaxially oriented polyolefin film against shrinkage, heating the restrained film to a heat-setting temperature between (T−20) and (T−70)°C., permitting the restrained film to undergo an area shrinkage at the heat-setting temperature of not more than 20%, and thereafter cooling the heat-set film to a temperature not exceeding (T−80)°C., wherein T°C. is the polyolefin melting temperature, as hereinbefore defined.

The conventional heat-setting operation may be effected by means of a stenter system or by a system of one or more heated rollers as disclosed, for example, in British Pat. No. 1,124,886.

The combination of a heat-treatment according to the invention with a conventional heat-setting operation, in addition to modifying the thermal shrinkage and modulus characteristics of the treated film, is of value in improving the hot heat-seal strength characteristics of a film having a surface layer of a polymeric, particularly a polyolefinic, heat-sealable material. Improvements in hot heat-seal strength are particularly desirable in the production of film packages by a "vertical form and fill" technique in which a series of discrete packages is formed by collapsing a tubular film and forming a succession of horizontal heat seals, usually crimp seals, across the width of the film, the desired quantity of product being introduced into each package in the interval between the formation of successive horizontal heat seals. At high operating speeds the product is introduced into the package substantially simultaneously with the creation of the lower horizontal heat seal, and to avoid rupture of the package it is therefore essential that the inherent strength of the lower heat seal should, before dissipation of all the thermal energy applied to create the heat seal, rapidly reach a level sufficient to support and retain the product introduced into the package, i.e., the packaging film should exhibit a high "hot heat-seal strength".

Measurement of the hot heat-seal strength of a film is conveniently effected by means of a calibrated strip of spring steel of approximately 25 mm width and 400 mm length. Calibration of the spring steel strip is effected by folding the strip over upon itself about its mid-point, somewhat in the form of a "C" with elongated limbs, and gradually applying an increasing load in the form of weights positioned on the uppermost limb adjacent the free end thereof until the free ends of the spring just make contact with each other. If, for example, the required loading of the selected spring is 150 grammes, the spring is rated as a "150 gramme spring".

A strip of a heat-sealable film having a width of 25 mm and a length of about 150 mm, is folded over upon itself for testing so that portions of the heat-sealable surface layer are in contact with each other, and the free ends of the film strip are secured by a suitable adhesive to the outermost surface of the free ends of the previously calibrated spring strip. The latter is maintained under manual compression so that the free ends of the spring strip remain in contact until the opposed surfaces of the film strip are sealed together between the heated jaws of a Sentinel Heat Sealer (Model No. 12AS), the free ends of the spring strip being positioned outside but immediately adjacent the edges of the sealing jaws. The depth "y" of the jaws, aligned parallel to the longitudinal axis of the film strip, is 25 mm, so that a square heat-seal of side 25 mm is formed between the opposed surfaces of the film strip.

Upon closure of the sealing jaws the manual compression force is removed from the steel strip so that immediately upon retraction of the sealing jaws to the open position after formation of the heat seal, the free ends of the steel strip are allowed to spring apart thereby tending to rupture the newly created heat seal. The depth "x" of the opening thereby induced in the seal, parallel to the length of the film strip, provides a measure of the strength of the seal, the degree of seal opening being expressed in the form x 100/y%.

The invention is illustrated by reference to the following Examples.

EXAMPLES 1 TO 4

Samples of an un-heat-set biaxially oriented propylene homopolymer film, having a draw ratio of about 7:1 in each of the machine and transverse directions and a thickness of about 25 microns, were individually stretched taut over a rigid frame, placed in an air oven heated to a variety of treatment temperatures in a range above the minimum stress relaxation temperature of polypropylene, as hereinbefore defined, maintained at constant dimensions (by the frame) in the oven for about 2 minutes, removed from the oven and immediately quenched in a high velocity stream of cold air.

Thermal shrinkage of the treated films was assessed by freely supporting an unstressed sample of each treated film in an air oven at the specified shrinkage temperature for one minute and comparing the machine direction (MD) length of the sample before and after shrinkage.

In a comparative experiment (Example 4) a biaxially oriented propylene homopolymer film having on each surface a layer of a propylene-butene-1 copolymer which had been heat-set at a temperature of 130° C. on a matt-surfaced roller system of the kind described in British Pat. No. 1,124,886, was subjected to an identical thermal shrinkage test.

The resultant data are tabulated below.

TABLE

| Example | Treatment Temperature (°C.) | MD Shrinkage (%) | | |
|---|---|---|---|---|
| | | (126° C.) | 142° C. | 155° C.) |
| 1 | 165 | 4.5 | 3.9 | 22.0 |
| 2 | 170 | 3.5 | 6.1 | 19.0 |
| 3 | 175 | 3.5 | 4.4 | 8.7 |
| 4* | 130 | 7.0 | 12.7 | 38.0 |

*Comparative - not according to invention.

EXAMPLES 5 AND 6

A biaxially oriented un-heat-set propylene homopolymer film of the kind employed in Examples 1 to 3 was stretched taut over a rigid frame, rapidly heated while held under tension at constant dimensions by being placed in contact with the surface of a hot plate at a temperature of 165° C. for a period of 2 seconds, removed from the hot plate, and rapidly quenched to ambient temperature in a high velocity stream of cold air.

The tensile modulus (0.1% tangent) of the treated film was measured, after varying intervals of time, at a Relative Humidity of about 55%, in accordance with the standard method of ASTM D 882-75b. Results are tabulated below, together with comparative data (Example 6) from a sample of the same film which had not been exposed to the heat-treatment.

TABLE

| Example | Treatment Temperature °C. | Tensile Modulus (GPa) | | |
|---|---|---|---|---|
| | | Delay (hours) Temperature (°C.) | | |
| | | 24 19.3 | 44 19.5 | 240 22.3 |
| 5 | 165 | 2.22 | 2.60 | 2.96 |
| 6* | NIL | 2.59 | 2.57 | 2.40 |

*Comparative - not according to invention.

It is evident from the above data that although the tensile modulus of the film 24 hours after treatment is below that of the untreated film, the tensile modulus increases with time and eventually exceeds that of the untreated film.

EXAMPLES 7 TO 13

Samples of a biaxially oriented coextruded triple-layer film of total thickness about 25 microns (μm) having a propylene homopolymer core (melting thickness ~170° C.) and opposed surface layers, each of 1.2 μm thickness, of a random propylene-ethylene copolymer (melting temperature ~135° C.) containing approximately 5 weight % of ethylene were heat-treated by winding the film around and in contact with the polished surface of an internally-heated roll. The film was firmly pinned to the roll surface by inlet and exit nip rolls to prevent longitudinal shrinkage of the film, transverse film shrinkage being prevented, other than at the longitudinal film edges which experienced a small degree of thickening, by adhesion of the film to the polished surface.

Residence time of each portion of film in contact with the heated roll was approximately 5 seconds and the treated film was immediately cooled to ambient temperature by a high velocity stream of cold air and by passing the film around the surface of a cold roller.

Samples of the treated film were crimp heat-sealed on a Sentinel Heat Sealer, Model No. 12AS, operating at a jaw pressure of 15 psi (0.1 MNm$^{-2}$), a jaw closure time of 2 seconds, and a jaw temperature of 120° C.

Variations of the hot heat-seal strength (measured by the hereinbefore specified spring technique) of the resultant treated films in response to changes in the temperature of the treatment roll are recorded in the accompanying Table.

TABLE

| Example | Treatment Temperature (°C.) | Hot Heat-Seal Strength 150 g spring % opening |
|---|---|---|
| 7 | 135 | 100 |
| 8 | 145 | 60 |
| 9 | 150 | 30 |
| 10 | 155 | 21 |
| 11 | 160 | 24 |
| 12 | 165 | 24 |
| 13 | 170 | 3 |

The increase in hot heat-seal strength (less seal opening) to an acceptable level when the treatment temperature is increased to 155° C. (i.e. T−15° C. for the substrate polymer) is evident from these results.

EXAMPLES 14 TO 20

The procedure of Examples 7 to 13 was repeated save that the thickness of each of the propylene-ethylene random copolymer surface layers was reduced to 0.7 μm (from 1.2 μm).

Results are recorded in the accompanying Table.

TABLE

| Example | Treatment Temperature (°C.) | Hot Heat-Seal Strength 150 g spring % opening |
|---|---|---|
| 14 | 135 | 72 |
| 15 | 145 | 37 |
| 16 | 150 | 21 |
| 17 | 155 | 17 |
| 18 | 160 | 18 |
| 19 | 165 | 15 |
| 20 | 170 | 16 |

The improvement in hot heat-seal strength at elevated treatment temperatures is again evident.

EXAMPLES 21 to 27

The procedure of Examples 7 to 13 was repeated save that each of the propylene-ethylene copolymer surface layers was replaced by a layer (1.2 μm thick) of a random propylene-butene-1 copolymer (melting temperature ~140° C.) containing 12 weight % of butene-1.

Results are recorded in the accompanying Table.

TABLE

| Example | Treatment Temperature (°C.) | Hot Heat-Seal Strength 150 g spring % opening |
|---|---|---|
| 21 | 135 | 100 |
| 22 | 145 | 65 |
| 23 | 150 | 50 |
| 24 | 155 | 30 |
| 25 | 160 | 15 |
| 26 | 165 | 0 |
| 27 | 170 | 0 |

Acceptable sealing behaviour is again observed when the treatment temperature is increased above 155° C.

EXAMPLES 28 AND 29

The procedure of Example 26 was repeated, i.e. the propylene-butene-1 surfaced film was heat-treated at constant dimensions on a polished roll at a temperature of 165° C. Samples of the treated film were then crimp heat-sealed on a Sentinel Heat Sealer, Model No. 12AS, operating at a jaw pressure of 15 psi (0.1 MNm$^{-2}$) and jaw closure time of 2 seconds, a different jaw temperature being employed in sealing each of the respective samples.

For comparison an identical film was subjected to a conventional heat-setting treatment at 135° C. on a matt-surfaced roll system of the kind disclosed in British Pat. No. 1,124,886.

Results of hot heat-seal strengths at different sealing temperatures are recorded in the accompanying Table.

TABLE

| Ex. | Treatment Temperature (°C.) | Seal formed at °C. Hot Heat-Seal Strength 150 g spring % opening | | | | | | |
|---|---|---|---|---|---|---|---|---|
| | | 100 | 110 | 115 | 120 | 125 | 130 | 140 |
| 28 | 165 | 64 | 21 | 0 | 0 | 16 | 40 | 85 |
| 29* | 135 | 85 | 92 | 93 | 95 | 98 | 99 | 100 |

*Comparative - not according to the invention.

These results show that the hot heat-seal strength of the conventionally heat-set film was completely unacceptable, whereas that of the film treated according to the invention was acceptable (seal opening less than 30%) over a sealing temperature range of some 20° C. (approximately 118° to 128° C.).

EXAMPLES 30 TO 33

To illustrate the advantage of combining a conventional heat-setting treatment with a heat-treatment according to the invention a sample (1) of a coextruded biaxially oriented triple-layer film (total thickness ~25 μm), having a propylene homopolymer core and opposed surface layers (each of thickness ~0.5 μm) of a 50:50 weight blend of a propylene-butene-1 random copolymer (butene-1 content ~12 weight %) with a butene-1 homopolymer, was heated, while preventing shrinkage, to a temperature of 80° C. for 20 seconds. This pretreatment at 80° C. was intended as a normalising treatment to ensure that this and subsequent film samples, which might have been prepared at different times, could be tested on a truly comparable basis.

Identical samples of film (2), (3), (4), all of which were subjected to the aforementioned pretreatment at 80° C. were shortly thereafter subjected respectively to the following additional heat-treatments:

(2) heat-setting by heating in an air oven at 120° C. for 1 minute while allowing a linear shrinkage of 5% in the transverse direction (TD) but preventing shrinkage in the machine direction, (3) heat-treating by pressing, for 2 seconds, a taut film clamped tightly in a ring frame to maintain constant film dimensions, against the polished surface of a metal hot plate heated to a temperature of 162° C., followed by immediate cooling in a high velocity stream of cold air, (4) heat-setting, as in (2), followed by heat-treating, as in (3).

Thermal shrinkages of the variously treated films (transverse direction shrinkages) were assessed at various shrinkage temperatures in the manner described in Examples 1 to 4. Results are recorded in the accompanying Table.

TABLE

| Example | Treatment Temperature Sequence (°C.) | TD Shrinkage (%) (at °C.) | | | | |
|---|---|---|---|---|---|---|
| | | 120 | 130 | 140 | 145 | 155 |
| 30* | 80 | 10 | 15 | 25 | 29 | 47 |
| 31* | 80 + 120 | 4 | 9 | 17 | 21 | 39 |
| 32 | 80 + 162 | 4 | 6 | 12 | 14 | 31 |
| 33 | 80 + 120 + 162 | 4 | 5 | 9 | 11 | 26 |

*Comparative - not according to the invention.

The increased resistance to thermal shrinkage at various temperatures of films treated in accordance with the invention, and in particular, by a combined heat-setting and heat-treating operation, is evident from these results.

Similar results were obtained in respect of the thermal shrinkage behaviour of the films in the machine direction.

EXAMPLES 34 TO 38

To illustrate the advantageous combination of a heat-treatment according to the invention with a subsequent conventional heat-setting treatment, a sample (1) of a film identical to that of Examples 30 to 33 was heated, while preventing shrinkage, to a temperature of 80° C. for 20 seconds.

Identical samples of film (2), (3), (4), (5), all of which were subjected to the aforementioned treatment at 80° C. were respectively subjected to the following additional heat-treatments:

(2) heat-setting by heating in an air oven at 130° C. for 1 minute while allowing a 10% area shrinkage (5% linear shrinkage in each of the transverse and machine directions), (3) heat-treating by pressing, for 2 seconds, a taut sample of the film, clamped tightly in a ring frame, against the polished surface of a metal hot plate heated to a temperature of 162° C., followed by immediate cooling in a high velocity stream of cold air, (4) heat-setting, as in (2), followed by heat-treating, as in (3).

(5) heat-treating, as in (3), followed by heat-setting, as in (2).

Thermal shrinkages (transverse direction) of the treated films are recorded in the accompanying Table.

TABLE

| Example | Treatment Temperature Sequence (°C.) | TD Shrinkage (%) (at °C.) | | | | |
|---|---|---|---|---|---|---|
| | | 120 | 130 | 140 | 145 | 155 |
| 34* | 80 | 10 | 14 | 23 | 28 | 49 |
| 35* | 80 + 130 | 3 | 4 | 15 | 20 | 37 |
| 36 | 80 + 162 | 4 | 5 | 12 | 15 | 32 |
| 37 | 80 + 130 + 162 | 2 | 3 | 9 | 11 | 24 |
| 38 | 80 + 162 + 130 | 0 | 1 | 7 | 10 | 30 |

*Comparative - not according to the invention.

The improvement (reduction) in thermal shrinkage achieved by heat-treatment according to the invention and the benefits obtained by reversing the order of heat-setting and heat treating are evident from these results.

Similar results were obtained in respect of the thermal shrinkage behaviour of the films in the machine direction.

We claim:

1. A method of heat-treating a biaxially oriented polyolefin film comprising constraining the film against shrinkage, heating the constrained film within a period not exceeding 5.3T seconds to a treatment temperature in a range of from (T−15) to (T+10)°C., wherein T°C. is the melting temperature of the polyolefin, and thereafter cooling the treated film to a temperature not exceeding (T−80)°C.

2. A method according to claim 1 comprising heating the film to the treatment temperature within a period of from 0.05 to 200 seconds.

3. A method according to claim 1 comprising cooling the treated film to a temperature not exceeding (T−80)° C. in less than 30 seconds from initiation of the cooling sequence.

4. A method according to claim 1 comprising maintaining the dimensions of the film constant during the heat-treatment.

5. A method according to claim 1 comprising cooling the film to a temperature not exceeding 50° C. before heat-treating the film.

6. A method according to claim 1 comprising additionally heat-setting the film, before or after the heat-treatment, by restraining the film against shrinkage, heating the restrained film to a heat-setting temperature above the glass transition temperature (Tg) and below the stress relaxation temperature of the polyolefin and permitting the film to shrink at the heat-setting temperature to effect an area reduction of not more than 25%.

7. A method according to claim 6 comprising cooling the film to a temperature not exceeding 50° C. between the heat-setting and heat-treatment operations.

* * * * *